(12) United States Patent
Al-Salqan

(10) Patent No.: US 6,775,382 B1
(45) Date of Patent: *Aug. 10, 2004

(54) METHOD AND APPARATUS FOR RECOVERING ENCRYPTION SESSION KEYS

(75) Inventor: Yahya Y Al-Salqan, Mountain View, CA (US)

(73) Assignee: Sun Microsystems, Inc., Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/885,018

(22) Filed: Jun. 30, 1997

(51) Int. Cl.[7] .............................................. H04L 9/00
(52) U.S. Cl. ...................... 380/286; 380/280; 380/285
(58) Field of Search ..................... 380/21, 37, 280–286

(56) References Cited

U.S. PATENT DOCUMENTS

| | | | | |
|---|---|---|---|---|
| 5,142,578 A | * | 8/1992 | Matyas et al. | 380/280 |
| 5,481,613 A | * | 1/1996 | Ford et al. | 380/30 |
| 5,557,346 A | * | 9/1996 | Lipner et al. | 380/21 |
| 5,557,765 A | | 9/1996 | Lipner et al. | |
| 5,768,373 A | * | 6/1998 | Lohstroh et al. | 380/4 |
| 5,796,830 A | * | 8/1998 | Johnson et al. | 380/21 |
| 6,216,229 B1 | * | 4/2001 | Fischer | 713/182 |
| 6,289,105 B1 | * | 9/2001 | Murota | 380/286 |

OTHER PUBLICATIONS

Walker et al., "Commercial Key Escrow: Something for Everyone Now and for the Future", TIS Report #541, Jan. 3, 1993, retrieved from the Internet on Nov. 6, 2000, <http://www..epic.org/crypto/key_escrow/TIS_cke.html/>.*

Maher D.P., "Crypto Backup and Key Escrow", Communications of the ACM, Mar. 1996, vol. 39, No. 3, pp. 48–53.*
Walker et al., "Commercial Key Recovery", Communications of the ACM, Mar. 1996, vol. 39, No. 3, pp. 41–47.*
Lee, Y–C. et al, "on the Key Recovery of the Key Escrow System", Computer Security Applications Conference, Dec. 1997, Proceedings 13th Annual Conf., p. 217, section 1.2.*
Denning et al. "a Taxonomy for Escrow Encryption Systems", Communications of the ACM, Mar. 1996/vol. 39. No. 3, pp. 34–39.*
Menezes et al., "Handbook of 1–27 Applied Cryptography", 1997, CRC Press, Boca Raton, FL, US, XP002166431, p. 506, paragraph 4–p. 507, paragraph 1.

* cited by examiner

*Primary Examiner*—Douglas Meislahn
(74) *Attorney, Agent, or Firm*—Beyer Weaver & Thomas, LLP

(57) ABSTRACT

A method and apparatus allows a session key for a encrypted message to be recovered even if the recipient loses or forgets his private key. A session key encrypted using the public key of a party other than the intended recipient of the message is transmitted to the third party such as a certificate authority, who uses an identifier to retrieve private information known to the intended recipient of the message. The third party can compare the private information with private information provided by the party claiming to be the intended recipient. If the private information retrieved matches or nearly matches the private information provided, the third party can decrypt the session key using the third party's private key and provide the session key to the intended recipient. The intended recipient can then use the session key to decrypt the message, without making available the intended recipient's private key to any party other than the intended recipient, or storing the intended recipient's public key on the third party's system. Law enforcement agencies can intercept the message and the session key encrypted with the third party's public key and can provide to the third party a court order to retrieve the session key to decrypt the message without notifying the intended recipient.

33 Claims, 8 Drawing Sheets

METHOD AND APPARATUS FOR RECOVERING ENCRYPTION SESSION KEYS

FIELD OF THE INVENTION

The present invention is related to cryptography and more specifically to the recovery of encryption session keys.

BACKGROUND OF THE INVENTION

Messages, such as those transmitted between computers, may be encrypted to prevent unintended recipients from reading them. Messages may be encrypted using a symmetric encryption algorithm and a session key, both described below. The message is decrypted using a decryption algorithm and the session key used to encrypt the message. When the same key is used to encrypt and decrypt the message, the process is known as symmetric encryption and decryption. The Data Encryption Standard (DES) is an example of such a symmetric encryption algorithm. DES is described in Schneier, *Applied Cryptography*, (2d. ed., John Wiley & Sons, 1996).

The sender of the message transforms the message into a scrambled message known as cypher text by applying the message and the session key as inputs to the encryption algorithm. The sender then transmits the cypher text to the recipient and provides the session key to the recipient using a separate or secure communication way. The recipient transforms the cypher text into the original message by applying the session key and the cypher text as inputs to the decryption algorithm, which reverses the scrambling performed by the encryption algorithm.

Where a secure communication channel is not available or it is not desirable to use a communication channel separate from the communication channel used to send the cypher text, asymmetric encryption may be used for sending the session key. Asymmetric encryption uses a separate process to encrypt the session key, so that it may be transmitted over any communication channel, such as the Internet.

With asymmetric encryption, a pair of keys is used to asymmetrically encrypt and decrypt a message. The pair of keys includes a public key and a private key. The public key may be made available to others and can be used to encrypt the session key using an asymmetric encryption algorithm. Unlike the session key of symmetric encryption, the public key cannot be used to decrypt that which has been encrypted with it. Instead, a mathematically-related private key is required to decrypt the cypher text encrypted with the corresponding public key. This technique allows the recipient to provide his or her public key to others for sending messages to him or her, without providing them access to other messages encrypted using the public key.

Because asymmetric encryption and decryption can take longer to perform than symmetric encryption and decryption, a combination of both techniques are used to encrypt and decrypt a message. To prevent the sender from using a session key that is easily decipherable, such as the first name of the recipient, a session key generator may be used to generate a random session key of sufficient length. The message is encrypted using the relatively rapid symmetric encryption. The session key is encrypted using asymmetric encryption using the recipient's public key.

The encrypted session key and the cypher text are transmitted to the recipient. The recipient uses his private key to decrypt the encrypted session key, and then uses the session key to decrypt the message. Because the message is typically longer than the session key, the relatively more time consuming asymmetric encryption and decryption are performed only on the session key with relatively rapid symmetric encryption performed on the message.

The pair of public and private keys are generated by a cryptographic module, and provided to an individual, who shares the public key with others he expects will send him or her cypher text, while maintaining the secrecy of his or her private key. Because the generation of a private key using the public key is extremely difficult and time consuming, the recipient can even post his or her public key for the world to see.

In order to bind the public key and the identity of the owner, referred to herein as the "principal", a trusted party called a certificate authority ("CA") issues a certificate. The certificate provides evidence to third parties that a person owns the public key, so that no other party can claim ownership of the public key. In this manner, the public key is said to be "bound" to the owner.

The certificate authority can issue a certificate to any principal that wishes to bind his or her identity to the public key. In addition to the principal's public key, the certificate can include a certificate serial number; the principal's name; an organization name, which is often the principal's employer's name; an organizational unit name, often the division of the employer for whom the principal works; the locality, state and country of the employer or the residence, of the principal; and a pair of dates between which the certificate is valid. In addition, the certificate can include the public key, the name or identifier of the certificate authority issuing the certificate; and an electronic signature that may be used to verify the authenticity and integrity of the certificate. When the keys are originally issued, the certificate authority issues the private key and the certificate.

To ensure security of the private key, only the owner of the private key has access to it. In the event that the recipient loses or forgets his private key, it is virtually impossible to decrypt messages encrypted using the recipient's public key. Some certificate authorities keep a copy of each private key in a vault or other form of key escrow. However, a breach of security would allow an intruder to steal the private key and decrypt any message sent to the recipient.

Therefore, there is a need for a method and system to allow individual messages to be decrypted only by the intended recipient of the message in the event that the intended recipient loses or forgets his private key without providing access to every message in the event of a breach of security, and with a minimum of disruption to the existing encryption procedures already in place.

In addition, the United States government presently has a policy of allowing more secure encryption and decryption software to be exported if a key recovery is provided to allow law enforcement agencies to decrypt specified messages encrypted. Therefore, there is a need for a method and system to allow such decryption of such specified messages without compromising the security of the other messages.

SUMMARY OF INVENTION

In addition to the asymmetric encryption of the session key, a method and apparatus encrypts the session key and the intended recipient's public key or other identifier using the recipient's certificate authority's public key to create an encrypted key recovery field. The certificate authority stores the intended recipient's public key or other identifier and private information about the recipient such as the recipient's mother's maiden name and social security number in a database indexed using the public key. Should the recipient forget his private key or the password used to obtain it, he can send the encrypted key recovery field to the certificate authority, who can use its private key to decrypt the session key and the recipient's public key or other identifier. The public key is used to locate the private information about the recipient which the certificate authority can use to verify the identity of the requesting person who sent the encrypted key recovery field to the certificate authority. If the identity is sufficiently verified, the certificate authority can provide to the requesting person the session key it decrypts using its private key, which the requesting person can use to decrypt the message.

Because the information stored in the database may be provided by the principal to the certificate authority with the other information the principal provides for the certificate, the information stored in the database may be easily obtained. Because the key recovery field is added to the message, implementation does not interfere with existing encryption procedures. Because the certificate authority provides the session key for a single message, and only for those messages for which it receives a key recovery field, breaches of security will not allow an intruder to decrypt other messages. Law enforcement agencies with a court order can require the certificate authority to decrypt the key recovery field, allowing more secure technology to be exported without compromising the security of the messages.

DETAILED DESCRIPTION OF A PREFERRED EMBODIMENT

A trusted party such as a certificate authority requests from the principal and stores in a database certain information which may be used to identify the principal of the corresponding public key. Such information may include the principal's mother's maiden name, the principal's mother's date of birth, and the principal's social security number. The database is indexed using the principal's public key, allowing the principal's public key to be used to retrieve the answers.

When a sender wishes to send a message to a recipient, the following encryption procedure is used to encrypt and transmit the message. A session key is generated, for example by a conventional cryptographic module or other device capable of generating a session key, and the message is encrypted using this session key. The session key is encrypted using the recipient's public key. The sender also generates a key recovery field. The key recovery field includes the session key and can include recipient's public key, both encrypted using the public key of a trusted party such as the certificate authority that issued the certificate of the recipient's public key. The sender can send the encrypted message, encrypted session key and encrypted key recovery field to the recipient. The recipient can decrypt the encrypted session key using his or her private key, then decrypt the encrypted message using the decrypted session key.

If the recipient forgets his or her private key or forgets the password used to retrieve it, the recipient can forward the key recovery field to the certificate authority, who decrypts the key recovery field to obtain the session key and the recipient's public key. Using the public key as an index to the database, the certificate authority can obtain the previously stored information. The certificate authority requests the same information from the recipient of the message, and verifies the identity of the recipient by comparing the stored information with the information provided by the recipient. If both sets of information match, the certificate authority can provide the session key to the recipient, who may use it to decrypt the message.

In one embodiment, the present invention is implemented as computer software running on conventional computer systems, with one or more systems acting as one or more servers and one or more systems acting as one or more clients, although other implementations may be used.

Figure 1:
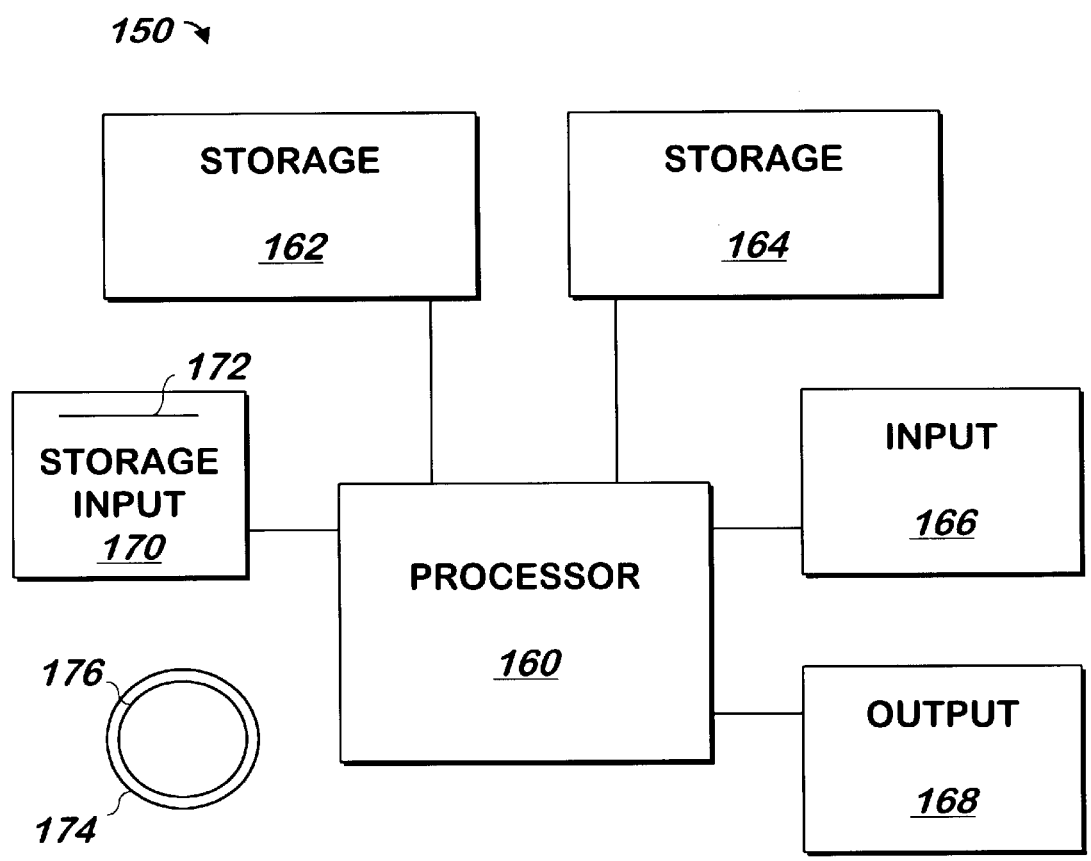
FIG. 1 is a block schematic diagram of a conventional computer system.

Referring now to FIG. 1, a conventional computer system 150 for practicing the present invention is shown. Processor 160 retrieves and executes software instructions stored in storage 162 such as memory which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program product 174 such as a conventional floppy disk or CD-ROM that may be used to transport computer instructions or data to the system 150. Computer program product 174 has encoded thereon computer readable program code devices 176, such as magnetic charges in the case of a floppy disk or optical encodings in the case of a CD-ROM which are encoded to configure the computer system 150 to operate as described below.

Figure 2:
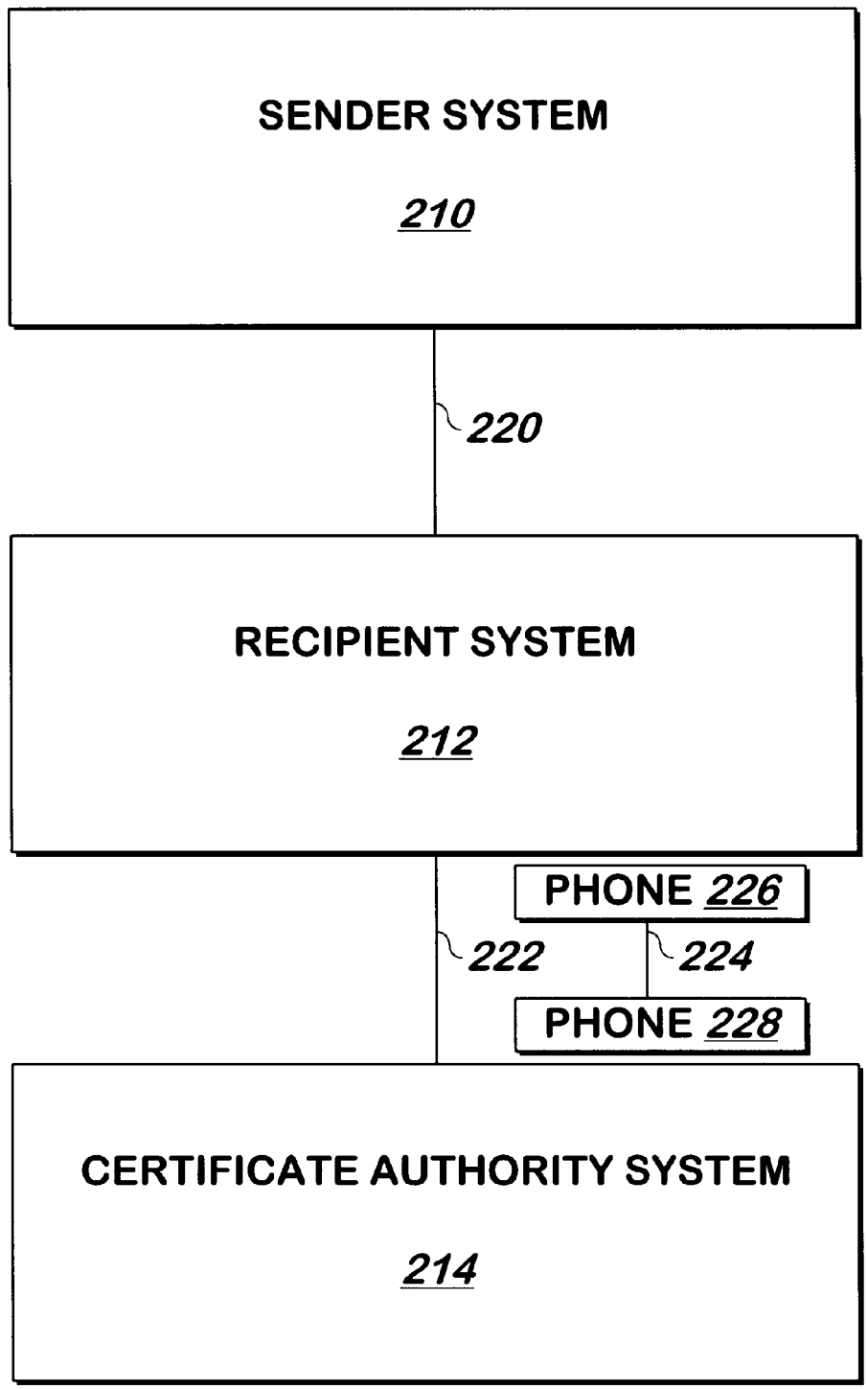
FIG. 2 is a block schematic diagram of three computer systems coupled using two communications links according to one embodiment of the present invention.

In one embodiment, three computer systems 150 may be used to implement the present invention. Referring now to FIG. 2, three computer systems 210, 212, 214 coupled with two remote communications links 220, 222 according to one embodiment of the present invention are shown. The computer systems 210, 212, 214 are systems 150 of FIG. 1 with software performing the functions described herein. One system 210 is a sender system that operates to perform encryption and transmission functions described below to transmit encrypted messages to recipient system 212 via conventional communications link such as a pair of modems and a telephone line or the Internet. The second system 212 is a recipient system which receives and stores messages, encrypted session keys and encrypted key recovery fields received from the sender system 210 can forward the encrypted key recovery field to certificate authority system 214 via communications link 222 similar to communications link 220, can decrypt the session key when the proper private key is entered, and can decrypt messages once the session key is decrypted as described below. The third system 214 is a certificate authority system which can accept and decrypt an encrypted key recovery field received from the recipient system 212, provide the session key from the encrypted key recovery field and can be used to verify the identity of the party requesting the decryption of the key recovery field.

Referring now to FIGS. 1 and 2, in one embodiment, each system 150 for the computers 210, 212 and 214 is a conventional Sun Microsystems Ultra Sparc Creator computer running the Solaris 2.5.1 operating system commercially available from Sun Microsystems of Mountain View, Calif., although other systems may be used.

Figure 3:
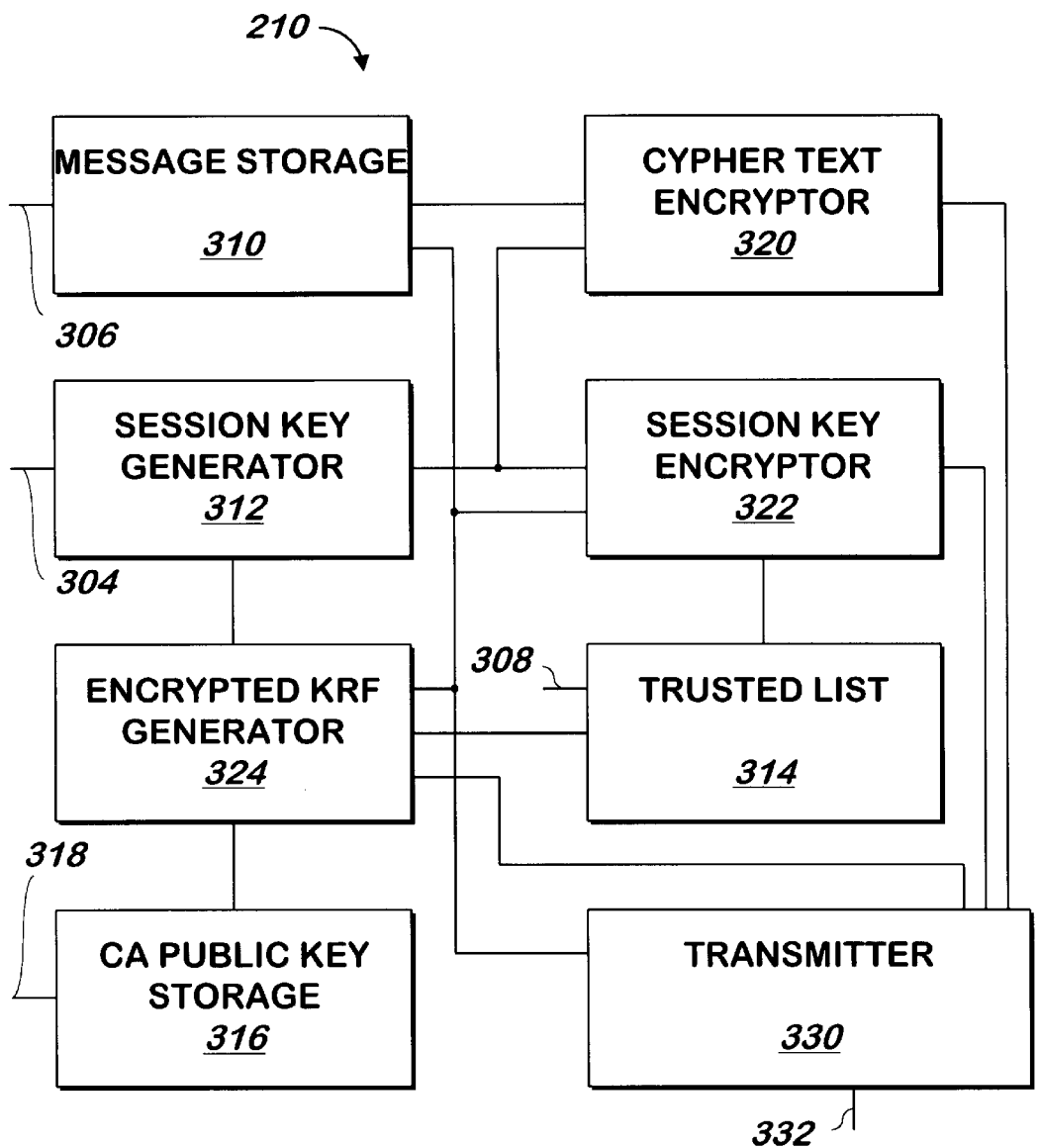
FIG. 3 is a block schematic diagram of a sender system according to one embodiment of the present invention.

Referring now to FIG. 3, the sender system 210 of FIG. 2 according to one embodiment of the present invention is shown. A message is received for encryption to cypher text at input 306 and stored unencrypted in message storage 310. Conventional session key generator 312 generates a session key as a string of random alphanumeric characters or optionally receives a session key at input 304. Key generation is described in Schneier, *Applied Cryptography*, (2d. ed., John Wiley & Sons, 1996). The session key generated or received and stored in session key generator 312 and message text stored in message storage 310 are provided to conventional cypher text encryptor 320 which encrypts the message using conventional symmetric encryption techniques and using the session key and stores the cypher text. Conventional encryption techniques are described in Schneier, *Applied Cryptography*, (2d. ed., John Wiley & Sons, 1996).

In one embodiment, the message received by cypher text encryptor 320 contains a field having a known value for use as described below. In another embodiment, the cypher text encryptor 320 inserts the field with the known value into the message prior to encryption. The field is used as described below.

Trusted list accepts at input 308 and stores one or more public keys of persons or entities with whom the sender of the message stored in message storage 310 intends to communicate. These persons or entities to whom a message is directed are referred to as the "intended recipients". Using input 308, the sender indicates which of the keys from the trusted list 314 to use, and trusted list 314 passes the public key to conventional session key encryptor 322 which receives the session key from session key generator 312 and encrypts the session key using the recipient's public key specified using a conventional asymmetric encryption algorithm. Trusted list 314 also provides the public key to encrypted KRF generator 324, which receives the session key from session key generator 312 and appends the recipient's public key it receives to the session key.

In one embodiment, inputs 308 and 318 are coupled to the message storage 310 to allow designation of the intended recipient via one or more fields in the message. CA public key storage 316 contains the public keys of one or more certificate authorities that issued the public keys of the recipients stored in the trusted list 314. The certificate authority's public keys are entered using input 318 and the public key of the certificate authority corresponding to the recipient is designated by the user using input 318. In one embodiment, CA public key storage is a part of the trusted list, which contains for each potential recipient, their name, their public key and the public key of the certificate authority that issued their public key. This data is related along with the user name or other identifier of the intended recipient so that the user only needs to designate the name of the intended recipients in a message header: each intended recipient's public key and the corresponding public key of the certificate authority are automatically provided by trusted list 314 and or including CA public key storage 316 using a look up based on the message header received from message storage 310.

Encrypted KRF generator 324 encrypts using conventional asymmetric encryption techniques the KRF it builds using the public key of the recipient's certificate authority it receives from CA public key storage 316. The unencrypted header of the message, cypher text of the message, encrypted KRF and encrypted session key are provided to transmitter 330 by message storage 310, cypher text encryptor 320, encrypted KRF generator 324 and session key encryptor 322, respectively, which transmits via output 332 the cypher text, encrypted session key and the encrypted KRF to the intended recipient based on the message header.

If there are additional intended recipients, the apparatus repeats the procedure above for each intended recipient identified using the inputs 308, 318 or the message header of the message stored in message storage 310.

Figure 4:
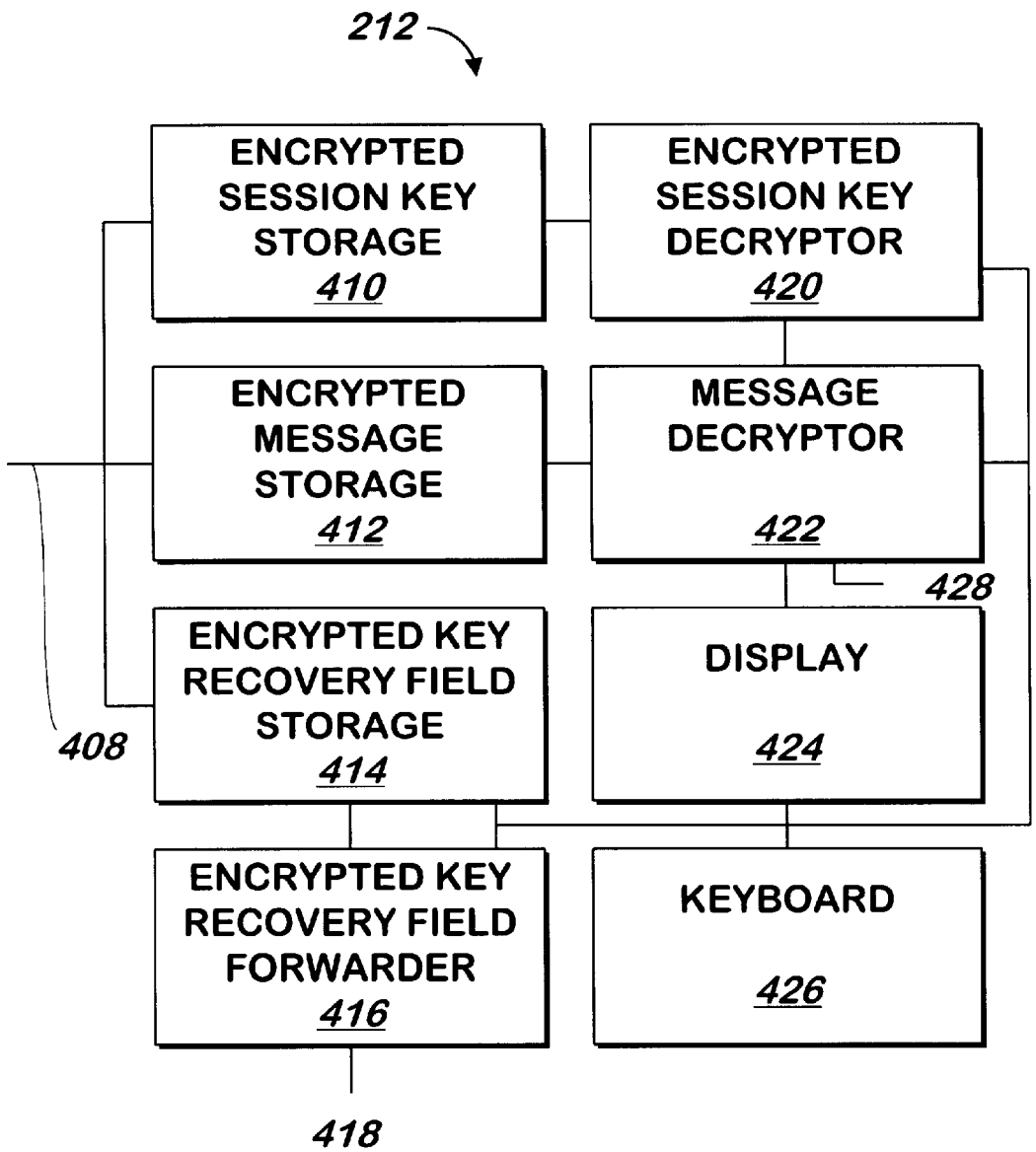
FIG. 4 is a block schematic diagram of a sender system according to one embodiment of the present invention.

Referring now to FIG. 4, the recipient system 212 of FIG. 2 according to one embodiment of the present invention is shown. The encrypted message, session key and key recovery field described above are received at input 408 and stored in encrypted session key storage 410, encrypted message storage 412 and encrypted key recovery field storage 414. Message decryptor 422 uses the display 424 to prompt the user of the system for his or her private key or for a password corresponding to his or her private key. The user types a key into keyboard 426 and encrypted session key decryptor 420 receives from encrypted session key storage 410 the encrypted session key and the key typed by the user and uses conventional asymmetric decryption techniques to produce a decrypted session key. The decrypted session key is provided by encrypted session key decryptor 420 to message decryptor 422. Message decryptor receives from encrypted message storage 412 the encrypted message and applies conventional symmetric decryption techniques to decrypt the message and provide it to the display 424 for display to the user. Decryption techniques are described in Schneier, *Applied Cryptography*, (2d. ed., John Wiley & Sons, 1996).

In one embodiment, if the user can recognize that the message has been properly decrypted, no further action is necessary. If the user believes the message is not properly decrypted because the key typed into the keyboard 426 was not the private key, or password corresponding to the private key, that can be used to decrypt the encrypted message, the user can use the keyboard 426 to direct the encrypted key recovery field storage 414 to provide the encrypted key recovery field to encrypted key recovery field forwarder 416, and direct encrypted key recovery field forwarder 416 to forward via output 418 the encrypted key recovery field to his or her certificate authority or other party that has the private key corresponding to the public key used to encrypt the encrypted key recovery field received at input 408.

In another embodiment, the detection of whether the decryption of the message by message decryptor 422 successfully deciphered the message is automated using a field with a known value in the message inserted prior to encryption as described above, and if that value is not detected by message decryptor 422, it signals encrypted key recovery storage 414 to pass the encrypted key recovery field to encrypted key recovery forwarder 416 for forwarding to another party as described herein. When the session key is received from such party, the user can type it into the keyboard 426 to provide it to message decryptor 422, which retrieves the encrypted message from encrypted message storage 412 and uses the session key to decrypt the message using conventional symmetric decryption techniques. The message is available to the user for display via display 424 or for storage in the message decryptor 422 or elsewhere via output 428.

Figure 5:
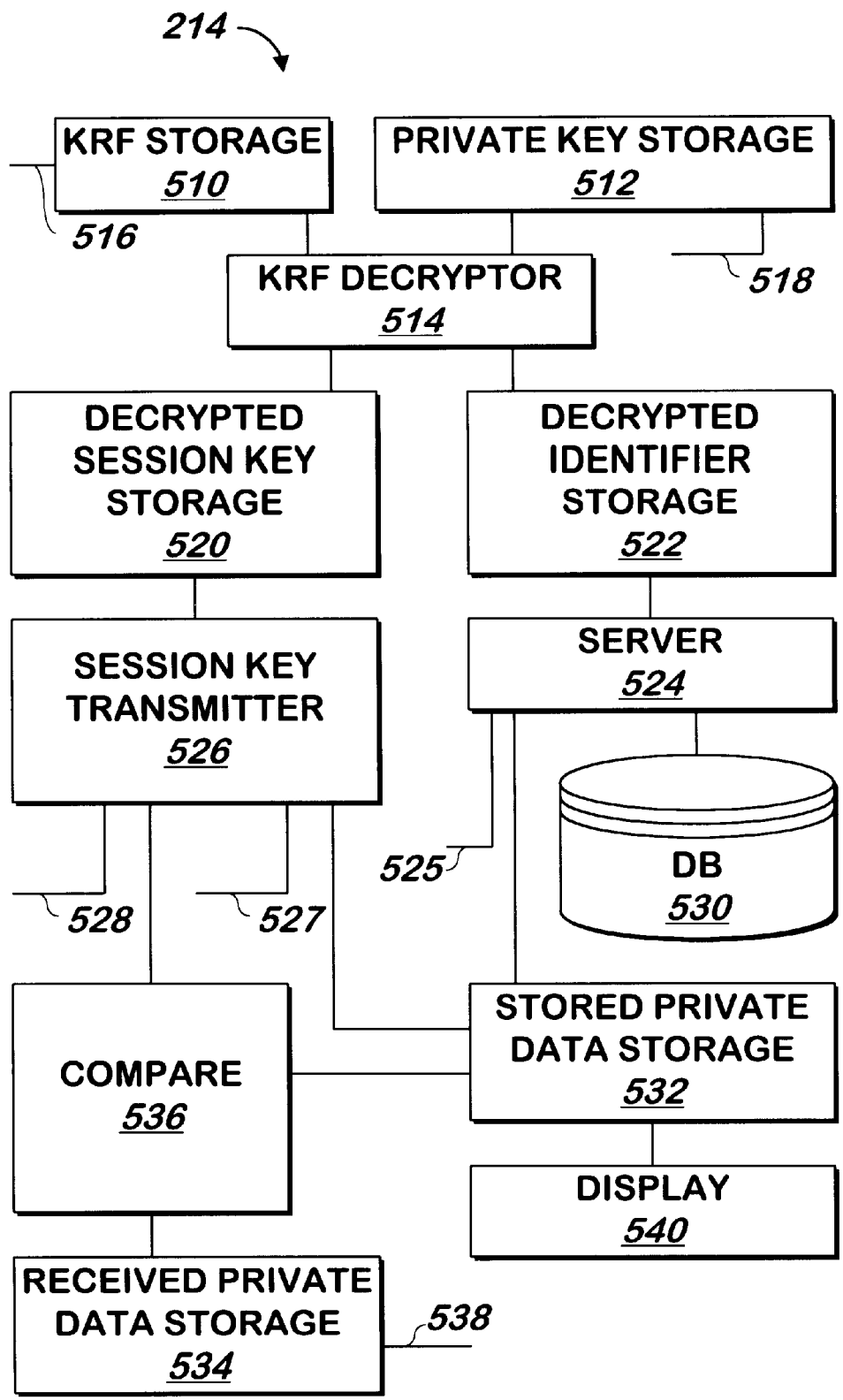
FIG. 5 is a block schematic diagram of a recipient system according to one embodiment of the present invention.

Referring now to FIG. 5, one embodiment of the certificate authority system 214 of FIG. 2 is shown.

Parties who have made prior arrangements to recover the key recovery fields provide private information that can be used to verify the identity of the party at a later time. Private information for each such party received such as social security number, mother's maiden name and/or other information that is relatively unknown except to the party from whom the key recovery field was received is entered via input 525 and maintained in a conventional database 530 via a conventional server 524 such as the Oracle 7 product commercially available from Oracle corporation of Redwood Shores, Calif. The private information is indexed using the unique identifier such as the recipient's public key, that will be sent with or as a part of the key recovery field.

When a party that has made the arrangements to store the private information as described above loses or forgets its private key, it sends the key recovery field to the system 214 via a communication line or link. KRF storage 510 stores in memory or disk the encrypted key recovery field received at input 516 coupled to a recipient system 212 of FIG. 2. The private key that can be used to decrypt the key recovery field stored in KRF storage 510 is stored in private key storage 512 made of memory or disk, having been input via input 518. KRF decryptor 514 receives the key recovery field from KRF storage 510 and the recipient's certificate authority's private key from private key storage 512 and uses conventional asymmetric decryption techniques to decrypt the key recovery field.

In one embodiment, the key recovery field contains a session key and an identifier. The identifier can be the public key of the party from whom the key recovery field was received or any other unique identifier that can identify the party from whom the key recovery field was received. The decrypted identifier is stored in decrypted identifier storage 522 made from a storage device such as memory or disk, and the decrypted session key is stored in decrypted session key storage 520 made from a storage device such as memory or disk.

The server 524 receives the decrypted identifier and uses it as an index to retrieve the private information corresponding to the identifier that is stored in the database 530. The private information is passed to stored private data storage 532 which is made from a storage device such as memory or disk. Referring momentarily to FIG. 2, the party from whom the key recovery field was received sends via a secure or separate communication line such as conventional telephones 226, 228 and conventional telephone line 224 a copy of the private data.

Referring again to FIG. 5, in one embodiment, the copy of the private data is stored in received private data storage 534 which is made from a storage device such as memory or disk. This private data is compared with the data retrieved from the database and stored in stored private data storage 532 using compare 536, and if the data in stored private data storage 532 matches the data in received private data storage 534, compare 536 signals session key transmitter 526 to retrieve the session key stored in decrypted session key storage 520 and transmit it to the party from whom the key recovery field was received using a secure e-mail system having and an e-mail address that was retrieved from the database 530 into stored private data storage 532.

In another embodiment, a human operator replaces the compare 536 and received private data storage 534. The operator views on a display screen 540 the data in stored private data storage 532, and prompts the party from whom the key recovery field was received to recite the data by asking for their social security number, mother's maiden name or other private data, and if the responses approximately match those stored in the stored private data storage 532, uses input 527 to direct the session key transmitter 527 to retrieve the session key stored in decrypted session key storage 520 and transmit it to the party from whom the key recovery field was received using an e-mail address that was retrieved from the database 530 into stored private data storage 532 or other location as described by the party providing the private information. The certificate authority or other trusted person receiving the key recovery field solely for purposes of decrypting it and providing the session key to another party is not an "intended recipient" as used herein.

Figure 6:
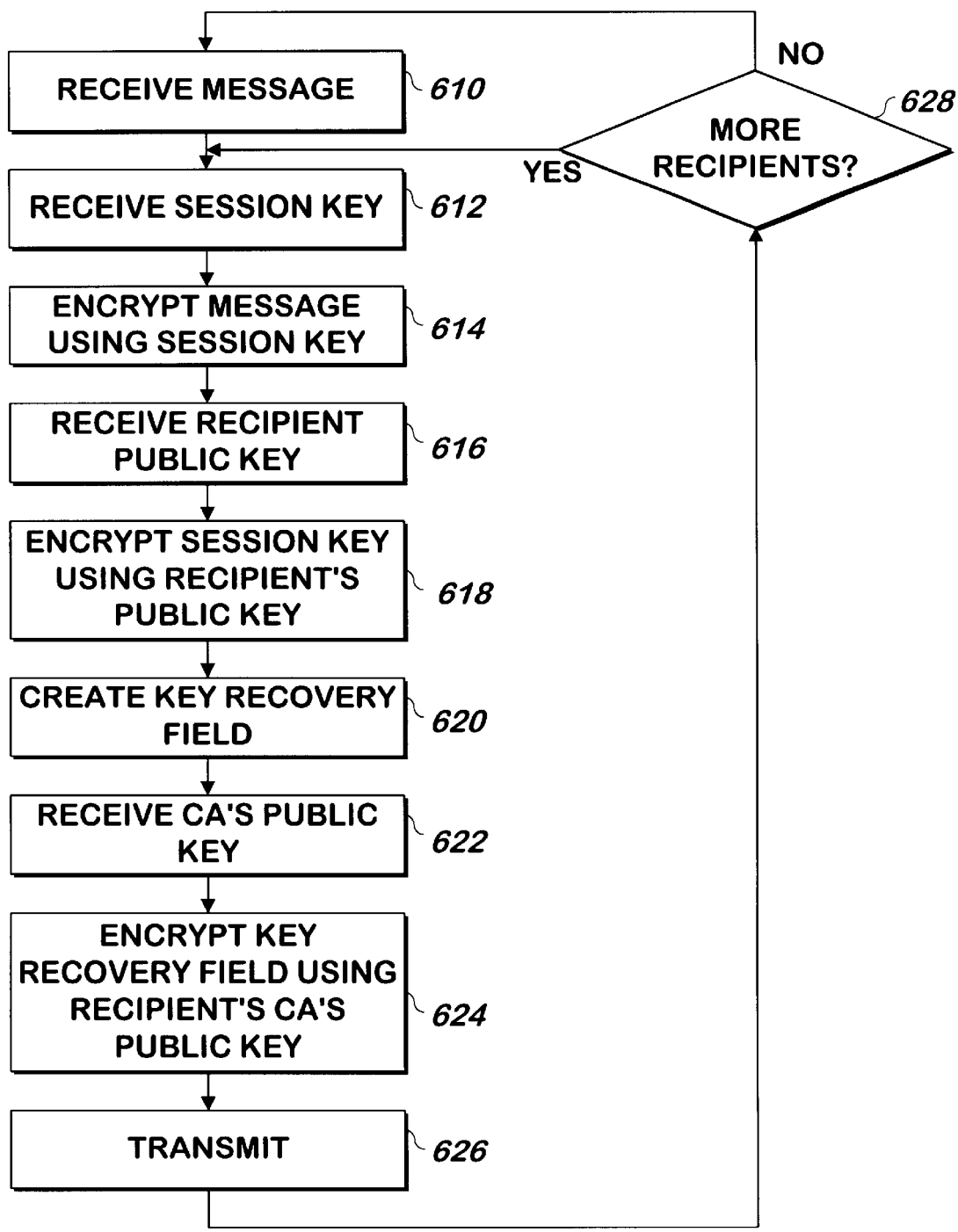
FIG. 6 is a flowchart illustrating a method of encrypting a message according to one embodiment of the present invention.

Referring now to FIG. 6, a method of encrypting a message and a session key according to one embodiment of the present invention is shown. The message, which can contain a header describing its intended recipients and containing other information, is received 610. A session key is received 612, either by receiving it from an external source or generating it using conventional key generation methods as described above. The message is encrypted 614 using conventional symmetric decryption techniques and the session key from step 612. The recipient public key is received either from an external source or using a lookup based on one of the recipients in the message header as described above. The session key is encrypted 618 using conventional asymmetric encryption methods and the public key of the recipient as described above.

A key recovery field is created 620, which contains the unencrypted session key from step 612 and an identifier of one of the intended recipients, such as the public key received in step 616. The public key of the certificate authority corresponding to the key of step 616 is received 622, either from an external source or using a lookup based on the intended recipient as described above. The key recovery field is encrypted 624 using conventional asymmetric encryption techniques and the public key received in step 622.

The encrypted message of step 614, encrypted session key of step 618 and encrypted key recovery field of step 624 are transmitted to the intended recipient whose public key was received in step 616. If the message is intended for additional recipients 628, the method repeats at step 612 using a different recipient in step 616, session key in step 612, and if necessary, a different public key 622 until the transmission step 626 has occurred for all recipients for whom a public key is available. If another message is available, it is received at step 610 and the method repeats.

Figure 7:
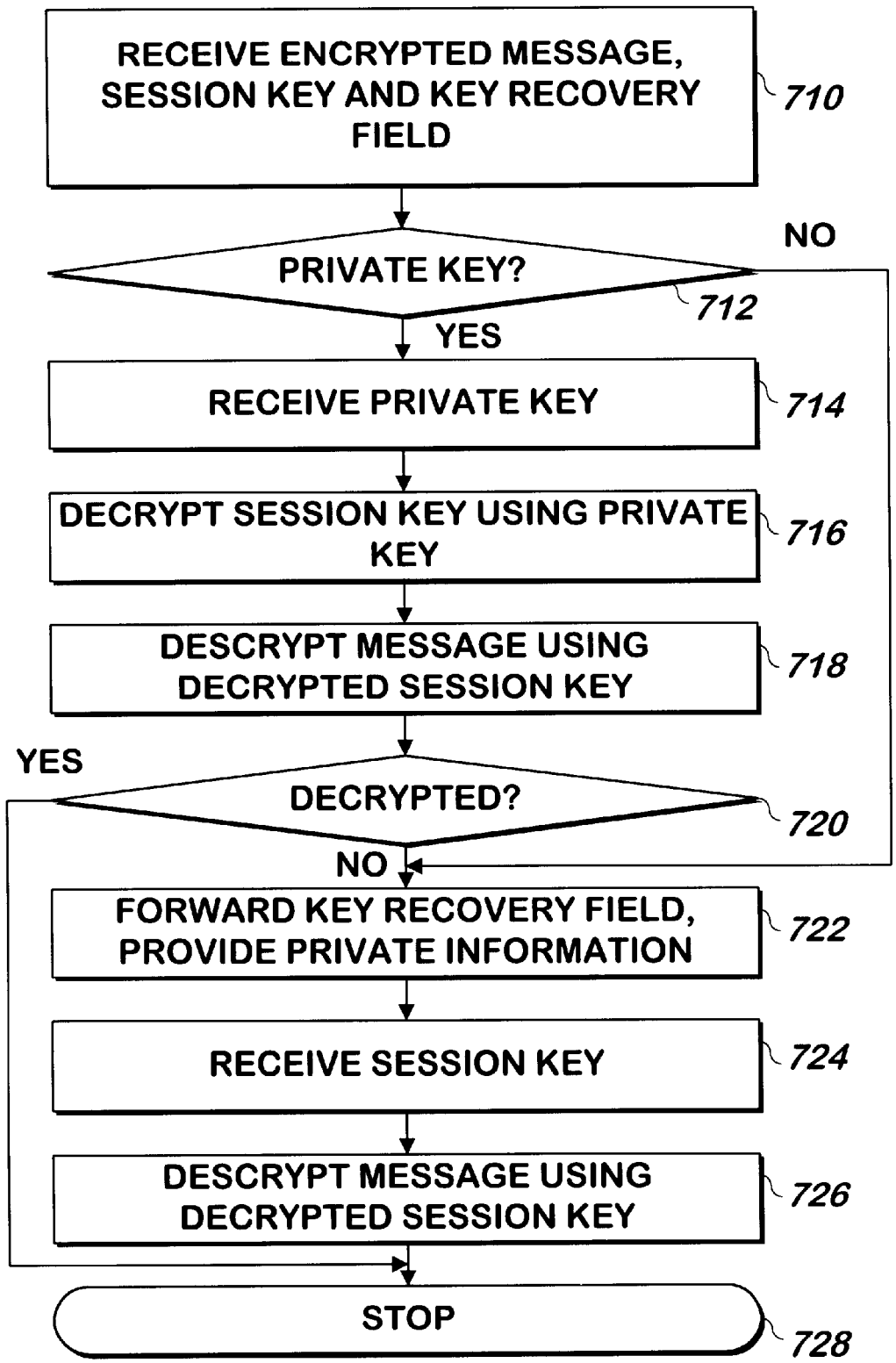
FIG. 7 is a flowchart illustrating a method of decrypting a message according to one embodiment of the present invention.

Referring now to FIG. 7, a method of decrypting messages according to one embodiment of the present invention is shown. The message, session key and key recovery field, each encrypted as described herein are received 710. The user is prompted for his private key and if a private key is entered in response to the prompt 712, the key is received 714. The key received in step 714 is used with conventional asymmetric decryption techniques to decrypt 716 the session key received in step 710, and the decrypted session key decrypted in step 716 is used to decrypt 718 the message.

If the message is properly decrypted 720, the method stops. Proper decryption can be detected manually by the user reviewing the message, or automatically, for example by comparing a field that has a known value when properly decrypted with the known value.

If the message is not properly decrypted or the private key is damaged, not available or the password corresponding to the private key is forgotten, the key recovery field is forwarded to the certificate authority along with private information such as mother's maiden name, social security number or other information likely to be known only to the owner of the private key 722. The certificate authority decrypts the key recovery field as described below, and returns the session key, which is received 724 and used with conventional symmetric decryption techniques to decrypt the message 726.

Figure 8:
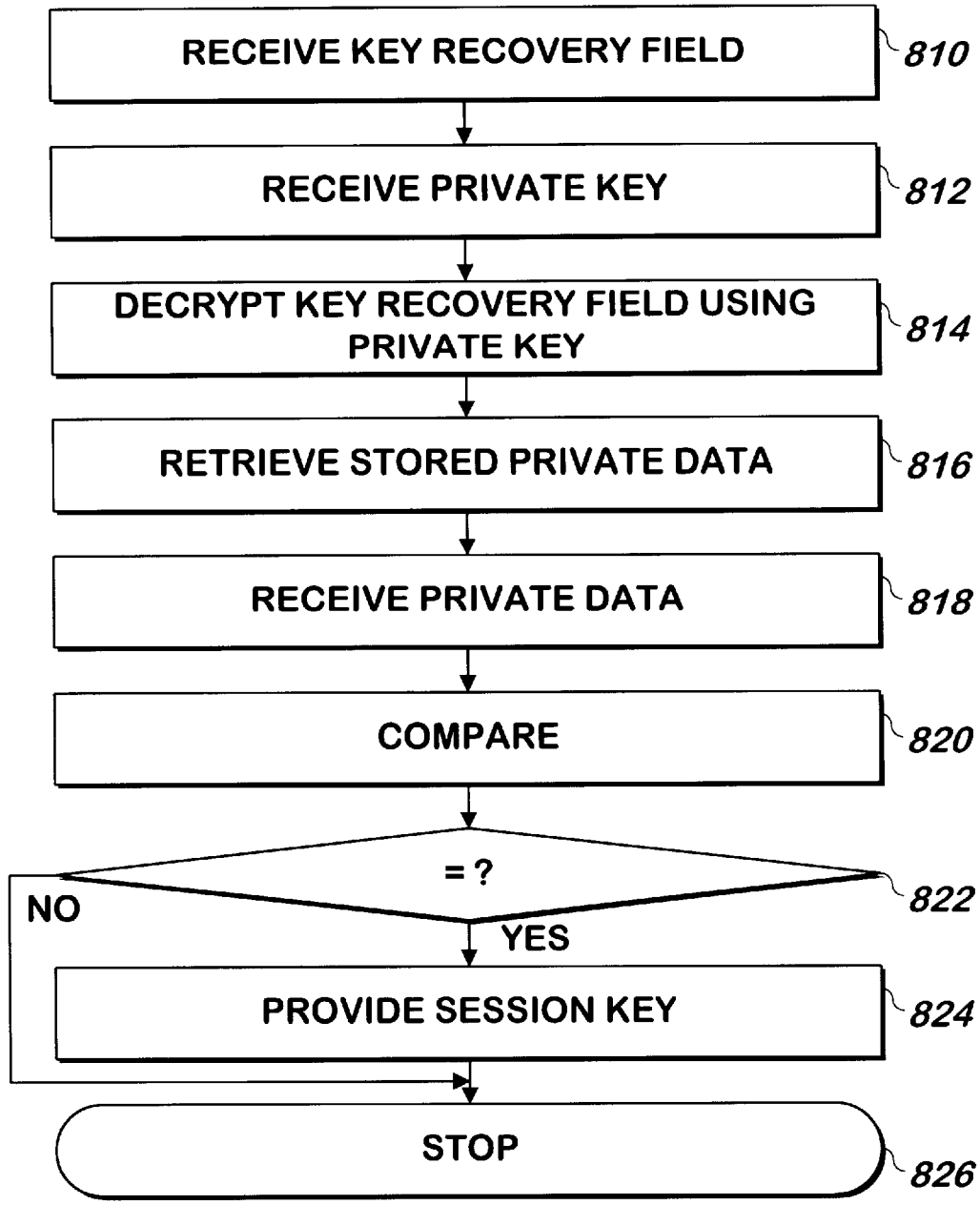
FIG. 8 is a flowchart illustrating a method of providing a session key according to one embodiment of the present invention.

Referring now to FIG. 8, a method of providing a session key according to one embodiment of the present invention is shown. The key recovery field is received 810 and a private key is received 812. In one embodiment, the private key is received by retrieving it from storage, and in another embodiment, the key is provided at an input device such as a keyboard. The key recovery field received in step 810 is decrypted using the private key received in step 812.

Private data stored prior to the receipt of the key recovery field in step 810 is retrieved 816 using an identifier received as an index to a database or other file of stored private data. The private data can be stored in the database at the time the certificate authority issues a corresponding certificate. In one embodiment, the identifier is received as a part of the key recovery field received in step 810. In another embodiment, the identifier is received separately from the key recovery field. In one embodiment, the identifier is the public key of the party from whom the key recovery field is received in step 810. The identifier can be any identifier that uniquely identifies the party from whom the key recovery field is received in step 810.

Private data is received 818 from the party from whom the key recovery field is received in step 810, in response to prompts via the telephone in one embodiment, or a secure communication line in another embodiment, and some or all of the data received in step 818 is compared 820 with the corresponding private data retrieved in step 816. If a match or near match results from the comparison 822, the session key decrypted as a part of the key recovery field in step 814 is provided, in one embodiment to the party from whom the key recovery field is received in step 810.

The message and key recovery field can also be intercepted by law enforcement authorities, who can provide a court order requiring the certificate authority or other party having the private key that can decrypt the key recovery field to decrypt the key recovery field, allowing decryption of the message without notifying the intended recipient.

What is claimed is:

1. An apparatus for encrypting at least one message and at least one session key, the message being transmitted to at least one intended recipient by a sender, wherein the at least one intended recipient and the sender are different entities, the apparatus having an input and an output and comprising:

a cypher text encryptor having a first input coupled to the apparatus input to receive the at least one message, and having a second input coupled to receive the at least one session key, the cypher text encryptor for encrypting the message responsive to the session key to create cypher text provided at an output coupled to the apparatus output;

an encrypted KRF generator having a first input coupled to receive the session key, a second input coupled to receive a public key of a party that is not an intended recipient of the message, the encrypted KRF generator for producing a key recovery field for the at least one intended recipient comprising the session key and at least one identifier of the at least one intended recipient of the message, for encrypting the key recovery field responsive to the public key received at the second encrypted KRF generator input to produce an encrypted key recovery field provided at an output coupled to the apparatus output;

a session key encryptor having a first input for receiving the session key and a second input for receiving a public key of the at least one intended recipient of the message, the session key encryptor for encrypting the session key received at the session key encryptor first input responsive to the public key received at the session key encryptor second input to produce an encrypted session key provided at an output coupled to the apparatus output; and a packet generator for generating a data transmission packet to the at least one intended recipient, the packet comprising the cypher text, the encrypted key recovery field and the encrypted session key provided at the apparatus output.

2. The apparatus of claim 1 wherein the encrypted KRF generator additionally has a third input coupled to receive the at least one identifier.

3. The apparatus of claim 1 wherein the at least one identifier received at the second encrypted KRF generator input comprises at least one public key of at least one the intended recipients of the message.

4. A method of encrypting a message and a session key, the message being transmitted to at least one intended recipient by a sender, wherein the at least one intended recipient and the sender are different entities, the method comprising:

receiving by the sender a session key;

encrypting by the sender the message responsive to the session key to generate an encrypted message;

receiving by the sender a trustee key associated with a trustee that is not the same entity as the sender or the at least one intended recipient;

receiving by the sender a recipient key associated with the intended recipient;

generating by the sender a key recovery field for the at least one intended recipient, the key recovery field comprising the session key and at least one identifier of the at least one intended recipient of the message;

encrypting by the sender the key recovery field responsive to a trustee key to generate an encrypted key recovery field;

encrypting the session key by the sender responsive to the recipient key to generate an encrypted session key;

generating by the sender a data transmission packet comprising the encrypted message, the encrypted key recovery field and the encrypted session key; and transmitting by the sender the data transmission packet to the at least one intended recipient.

5. The method of claim 4 wherein the trustee key comprises a public key of a certificate authority.

6. The method of claim 5 wherein the certificate authority is a certificate authority that bound the recipient key to a name or identity of said intended recipient.

7. The method of claim 4 comprising the additional step of transmitting the data packet to the intended recipient.

8. A computer program product having a computer useable medium having computer readable program code embodied therein for encrypting a message and a session key, the message being transmitted to at least one intended recipient by a sender, wherein the at least one intended recipient and the sender are different entities, the computer program product comprising:

computer readable program code devices configured to cause a computer to receive a session key;

computer readable program code devices configured to cause a computer to encrypt the message responsive to the session key to generate an encrypted message;

computer readable program code devices configured to cause a computer to receive a trustee key;

computer readable program code devices configured to cause a computer to receive a recipient key;

computer program code devices configured to cause a computer to generate a key recovery field for the at least one intended recipient, the key recovery field comprising the session key and at least one identifier of the at least one intended recipient of the message;

computer program code devices configured to cause a computer to encrypted the key recovery field responsive to a trustee key to generate an encrypted key recovery field;

computer readable program code devices configured to cause a computer to encrypt the session key responsive to the recipient key;

computer readable program code devices configured to cause a computer to generate a data transmission packet comprising the encrypted message, the encrypted key recovery field and the encrypted session key; and computer readable program code devices configured to transmit the package to at least one intended recipient.

9. The computer program product of claim 8 wherein the trustee key comprises a public key of a certificate authority.

10. The computer program product of claim 9 wherein the certificate authority is a certificate authority that issued a certificate corresponding to the recipient key.

11. The computer program product of claim 8 additionally comprising computer readable program code devices configured to cause a computer to transmit the data packet to the intended recipient.

12. A method of decrypting a session key sent to a recipient by a sender, the method comprising:

a) the recipient receiving a data packet from the sender, the data packet comprising a plurality of data subpackets, wherein:

a first data subpacket includes an encrypted session key which is generated by encrypting the session key with a recipient encryption key; and a second data subpacket includes an encrypted key recovery field, the key recovery field comprising the session key and at least one identifier of the recipient, the key recovery field encrypted with a trustee encryption key;

b) providing a first submethod and a second submethod, wherein the first submethod comprises:

the recipient selecting the first data subpacket; and the recipient decrypting the session key using a recipient decryption key; and further wherein the second submethod comprises:

the recipient selecting the second data subpacket;

the recipient forwarding the second data subpacket to a trustee;

the trustee decrypting the session key using a trustee decryption key; and the trustee sending the recipient the session key in response to the trustee recognizing the recipient at least partially based on the at least one identifier of the recipient; and c) the recipient then selecting a first submethod or a second submethod.

13. The method of claim 12 wherein the data packet further comprises a third data subpacket including a message encrypted using the session key.

14. The method of claim 13 comprising the additional step of decrypting the encrypted message after the recipient performs the first submethod or the second submethod.

15. The method of claim 12 wherein the recipient encryption key is a public key of the recipient and further wherein the recipient decryption key is a private key of the recipient.

16. The method of claim 12 wherein the trustee encryption key is a public key of the trustee and further wherein the trustee decryption key is a private key of the trustee.

17. The method of claim 12 wherein the trustee is a certificate authority that bound the recipient encryption key to the name or identity of the recipient.

18. The method of claim 12 wherein the trustee recognizes the recipient when private information in the possession of the trustee and private information provided by the recipient to the trustee are substantially the same.

19. A computer program product having a computer useable medium having computer readable program code embodied therein for decrypting a session key sent to a recipient by a sender, the computer program product comprising:

a) computer readable program code devices configured to cause a computer to receive a data packet from the sender, the data packet comprising a plurality of data subpackets, wherein:

a first data subpacket includes the session key encrypted with a recipient encryption key; and a second data subpacket includes a key recovery field comprising the session key encrypted with a trustee encryption key;

b) computer program code devices configured to a cause a computer to provide a first submethod and a second submethod;

c) computer readable program code devices configured to cause a computer to permit the recipient to select the first submethod or the second submethod, wherein the first submethod comprises:

the recipient selecting the first data subpacket; and the recipient decrypting the session key using a recipient decryption key; and further wherein the second submethod comprises:
  the recipient selecting the second data subpacket;
  the recipient forwarding the second data subpacket to a trustee;
  the trustee decrypting the session key using a trustee decryption key;
  the trustee sending the recipient the session key in response to the trustee recognizing the recipient,
d) computer program code devices configured to cause a computer to receive a selection from the recipient that indicates the first or second submethod has been selected as a selected submethod; and
e) computer program code devices configured to cause a computer to perform the selected submethod.

20. The computer program product of claim 19 wherein the data packet further comprises a third data subpacket including a message encrypted using the session key.

21. The computer program product of claim 19 further comprising computer readable program code devices configured to cause a computer to decrypt the encrypted message after the first submethod or the second submethod is performed.

22. The computer program product of claim 19 wherein the recipient encryption key is a public key of the recipient and further wherein the recipient decryption key is a private key of the recipient.

23. The computer program product of claim 19 wherein the trustee encryption key is a public key of the trustee and further wherein the trustee decryption key is a private key of the trustee.

24. The computer program product of claim 19 wherein the trustee is a certificate authority that bound the recipient encryption key to the name or identity of the recipient.

25. The computer program product of claim 19 wherein the trustee recognizes the recipient when private information in the possession of the trustee and private information provided by the recipient to the trustee are substantially the same.

26. An apparatus for decrypting a session key sent to a recipient by a sender, the apparatus comprising:
  a) means for receiving a data packet from the sender, the data packet comprising a plurality of data subpackets, wherein:
    a first data subpacket includes the session key encrypted with a recipient encryption key; and
    a second data subpacket includes a key recovery field comprising the session key encrypted with a trustee encryption key;
  b) means for providing a first subpacket processor and a second subpacket processor;
  c) means for permitting the recipient to select said first subpacket processor or said second subpacket processor,
  wherein the first subpacket processor comprises:
    means for selecting the first data subpacket; and
    means for decrypting the session key using a recipient decryption key; and
  further wherein the second subpacket processor comprises:
    means for selecting the second data subpacket;
    means for forwarding the second data subpacket to a trustee;
    means for decrypting the session key using a trustee decryption key;
    means for sending the session key to the recipient in response to the trustee recognizing the recipient.

27. The apparatus of claim 26 wherein the data packet further comprises a third data subpacket including a message encrypted using the session key.

28. The apparatus of claim 26 further comprising means for decrypting the encrypted message after selection of the first subpacket processor or the second subpacket processor.

29. The apparatus of claim 26 wherein the recipient encryption key is a public key of the recipient and further wherein the recipient decryption key is a private key of the recipient.

30. The apparatus of claim 26 wherein the trustee encryption key is a public key of the trustee and further wherein the trustee decryption key is a private key of the trustee.

31. The apparatus of claim 26 wherein the trustee is a certificate authority that bound the recipient encryption key to the name or identity of the recipient.

32. The apparatus of claim 26 wherein the trustee recognizes the recipient when private information in the possession of the trustee and private information provided by the recipient to the trustee are substantially the same.

33. A method of exchanging a message having at least one intended recipient, a sender, and encrypting a session key, wherein the intended recipient and the sender are different entities, the method comprising:
  receiving by the sender a session key;
  encrypting by the sender the message responsive to the session key to generate an encrypted message;
  receiving by the sender a trustee key associated with a trustee that is not the same entity as the sender or the at least one intended recipient;
  receiving by the sender a recipient key associated with the intended recipient;
  generating by the sender a key recovery field for the at least one intended recipient, the key recovery field comprising the session key and at least one identifier of the at least one intended recipient of the message;
  encrypting by the sender the key recovery field responsive to a trustee key to generate an encrypted key recovery field;
  encrypting the session key by the sender responsive to the recipient key to generate an encrypted session key;
  generating by the sender a data transmission packet comprising the encrypted message, the encrypted key recovery field and the encrypted session key;
  transmitting by the sender the data transmission packet to the at least one intended recipient;
  receiving by the at least one intended recipient the data transmission packet;
  extracting by the at least one intended recipient the encrypted key recovery field from the data transmission packet;
  forwarding by the at least one intended recipient the encrypted key recovery field to the trustee;
  determining by the trustee at least partially based on the intended recipient key whether the trustee should transmit the session key to the at least one intended recipient; and
  transmitting by the trustee the session key to the at least one intended recipient when the determining determines that the trustee should transmit the session key.

* * * * *